United States Patent [19]

Montplaisir

[11] 4,308,643
[45] Jan. 5, 1982

[54] FISH STRINGER HOLDER

[76] Inventor: James J. Montplaisir, Route 2, Fargo, N. Dak. 58102

[21] Appl. No.: 180,672

[22] Filed: Aug. 25, 1980

[51] Int. Cl.³ .................. A01K 97/10; F16G 11/00
[52] U.S. Cl. ........................ 24/132 R; 24/132 AA;
24/132 WL; 43/21.2; 43/55; 224/103
[58] Field of Search ...... 24/132 R, 132 AA, 132 WL,
24/115 R; 43/21.2, 55; 224/103; 248/534

[56] References Cited

U.S. PATENT DOCUMENTS

| | | | |
|---|---|---|---|
| 407,592 | 7/1889 | Harkness | 24/115 R |
| 536,684 | 4/1895 | Creager | 24/132 AA |
| 878,626 | 2/1908 | Guilford | 224/103 |
| 2,470,941 | 5/1949 | Orton | 224/103 |
| 2,734,671 | 2/1956 | Adams | 224/103 |
| 2,760,700 | 8/1956 | Lien | 224/103 |
| 2,958,977 | 11/1960 | May | 224/103 |
| 3,052,002 | 9/1962 | Lesher | 224/103 |
| 3,126,180 | 3/1964 | Mandolare | 248/534 |
| 3,677,214 | 7/1972 | Bernstein | 24/132 R |
| 3,783,548 | 1/1974 | Fisher | 224/103 |
| 3,802,652 | 4/1974 | Holton, Jr. | 248/534 |
| 4,193,174 | 3/1980 | Stephens | 24/132 WL |

FOREIGN PATENT DOCUMENTS 2913353 10/1979 Fed. Rep. of Germany .... 24/132 R

Primary Examiner—Victor N. Sakran
Attorney, Agent, or Firm—Kinney, Lange, Braddock, Westman & Fairbairn

[57] ABSTRACT

A device for holding a fish stringer, comprising an L-shaped frame made up of a base plate and a shoulder plate perpendicular to the base plate, and including jaw means pivotally mounted on the base plate for engagement with a flexible line such as a fish stringer between the jaw means and the shoulder plate. The jaw means describes an arc about the pivot which intersects the shoulder plate near a perpendicular line between the jaw pivot point and the shoulder plate. Normally the stringer can be easily removed by pulling a portion of it near the jaw means in direction perpendicular to the base plate. However, cover means are optionally provided for selectively and slidably covering the jaw means and the shoulder plate to selectively obstruct and not obstruct the removal of the stringer line from between the jaw means and the shoulder plate in a direction perpendicular to the plane of the base plate. Mounting means are attached to the frame and include stem means on the base plate which is sized to cooperatively associate with the gunwale of the boat.

5 Claims, 7 Drawing Figures

FISH STRINGER HOLDER

BACKGROUND OF THE INVENTION

One of the many problems faced by fisherman, even after fish have been located, an appropriate lure has been selected to catch them and the fish have been caught, is the necessity of holding or storing these fish during the remaining time spent fishing. Fish stringers are a convenient and inexpensive method of preserving fish in the water without losing them after they have been caught. The caught fish which has not yet been placed on the stringer must be firmly held with one hand at least. This makes it difficult for the fisherman to manipulate the fish stringer with his other hand. If the stringer cannot be readily handled in one hand without the danger of losing the entire stringer, because of the frustration of untying knots or removing fasteners, difficulties can occur which detract from the pleasure of fishing.

U.S. Pat. No. 878,626 granted to Guilford in February of 1908 discloses a fish stringer which has a pair of perpendicular tubes, such that the metal end of the stringer is passed through the first tube, transversely through the second tube, and finally into the end of the second tube. Cam means are provided to hold the stringer in the first tube. To remove the metal end, so as to add a fish to the stringer, the fisherman must remove the cam pressure and also remove the metal end of the stringer from both tubes. Since the metal point has to pass completely through the first tube, both hands of the operator are oftentimes necessary to prevent the stringer from jamming or falling away quickly as it leaves the tube. Hopefully the angler won't have to choose between the fish and the stringer.

U.S. Pat. No. 3,783,548 granted to Fisher in January of 1974 discloses a stringer for fish using a plurality of safety pins which hold the fish and which are strung on the line which can be submerged. The stringer means is attached to the gunwale of the boat.

U.S. Pat. No. 2,734,671 granted to Adams in February of 1956 discloses a stringer where the end opposite the needle or metal end forms a T-shaped retainer for keeping the fish on the cord until the perpendicular portion of the T is folded into the shank, thereby permitting removal of the fish. The stringer is tied to the boat.

U.S. Pat. No. 2,760,700 granted to Lien in August of 1956 discloses a dual ended fish stringer where fish can be put on either end by recessing the stringer line into the end piece, with the end piece forming a T-shape thereafter for keeping the fish on the stringer. The closed or loop end of the stringer is hooked to the boat.

U.S. Pat. No. 2,958,977 granted to May in November of 1960 discloses a combination fish stringer and hook extractor wherein the plain end of the stringer is crimped in a pair of jaws which have inwardly extending teeth projecting from the concave inner sides of the jaws to be embedded in the cord. A sleeve covers the jaws to engage the cord or stringer rope.

The foregoing patents were located in a preliminary search. Applicant and those in privity with him know of no closer prior art than that set out above; and they know of no prior art which anticipates the claim made in this application.

SUMMARY OF THE INVENTION

It has now been discovered that fish stringers and other flexible lines can be restrained by the device of the present invention, so as to permit engagement and detachment by one hand operation. Specifically, the device of this invention includes a frame having a base plate and a shoulder plate which is perpendicular to the base plate so as to define an L-shaped member. Also included is a jaw means for engagement of a line such as a fish stringer against the shoulder plate of the frame. The jaw means is pivotally mounted on the base plate in a position so as to describe an arc which is at least tangent to the base plate near a perpendicular line from the base plate of and passing through the jaw means pivot point. In the form of the invention as shown, mounting means are provided for mounting the frame on a large object such as a boat.

In a preferred embodiment, the device further includes a cover means for selectively and slidably covering and uncovering the jaw means. The cover means includes a means for preventing removal of the cord in a direction perpendicular to the plane of the base plate of the frame when the cover means is in a closed position. The cover means further includes means for locking the cover in a closed, jaw covering position. Bias means are provided between the cover means and the jaw means for urging the jaw means toward the shoulder plate at all times and for moving the cover means to its open, jaw uncovering position upon release of said cover locking means.

As shown, the mounting means mounting the device of the present invention to a large object includes stem means sized to cooperatively associate with the gunwale of a boat, such as by having a stem which can be inserted into an oarlock or into a special hole drilled for that purpose.

IN THE DRAWINGS

DESCRIPTION OF PREFERRED EMBODIMENT

Figure 1:
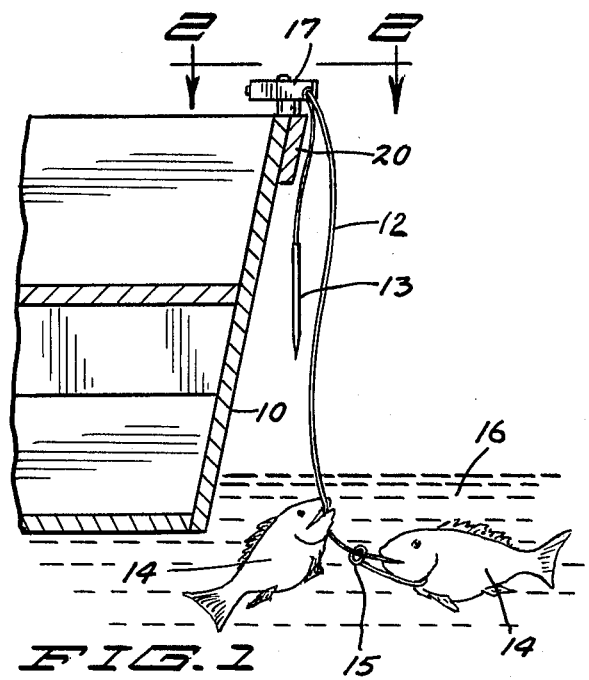
FIG. 1 is a diagrammatic cross sectional view illustrating the association of the fish stringer holder of the present invention with a boat and a fish stringer.
Figure 2:
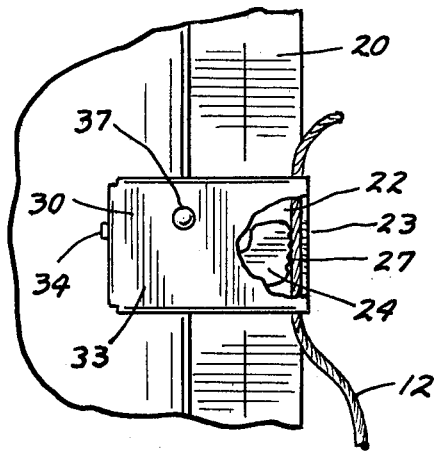
FIG. 2 is a fragmentary top plan view on the line 2—2 in FIG. 1 with parts broken away.
Figure 3:
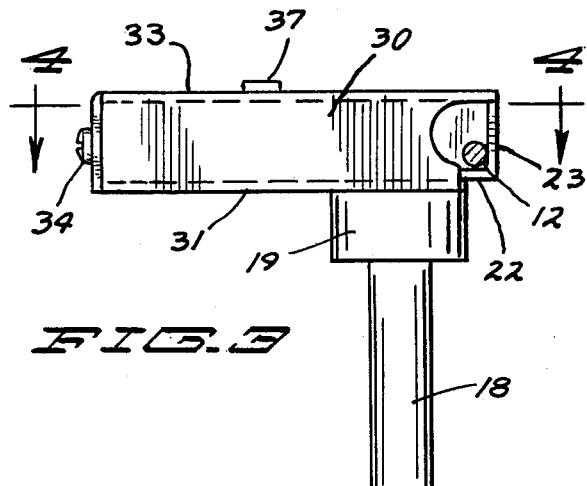
FIG. 3 is an enlarged view of the fish stringer holder of the invention positioned as seen in FIG. 1.

As shown in FIG. 1, a fish stringer 12 includes a metal pointed end or needle 13 on one end and a loop or ring 15 on the other. As shown, a plurality of fish 14 are on the stringer 12 and the stringer is fastened to a boat 10 by a fish stringer holder 17 of the invention. Stringers can be of any conventional or preferred construction and are readily available at any fishing or sporting goods store. In operation, the first fish is attached to the stringer 12 by passing the metal pointed end 13 through the mouth and gills and then through ring 15. Subsequent fish are put on the stringer by passing the metal needle 13 through the fish as previously described without use of the ring 15. The fish are then kept in water 16 at the side of the boat until fishing is completed.

The fish stringer holder 17 of the present invention is attached to boat 10 through a stem 18 which fits into the gunwale 20 of the boat up to a support block 19. Stem 18 may be sized to fit the oarlock of the boat 10 or a hole may be drilled in gunwale 20 if one does not already exist.

Holder 17 of the present invention includes a frame 11 which has a base plate 22 and a shoulder plate 23 which is perpendicular to the base plate. The plates 22 and 23 of the frame 11 can be formed from a single piece of metal such that the pieces form an L-shaped member.

Pivoted to the base plate 22 of the frame 11 is a jaw means 24 which is mounted on a pivot pin 26 in the base plate so that jaws 27 of jaw means 24 engage shoulder plate 23 by moving in direction of the arrow 28. The jaws 27 contact the shoulder plate 23 of the frame 11 at or near the point where a line through the axis of pivot pin 26 intersects and is perpendicular to the shoulder plate 23. Thus as the jaw means 24 is pivoted about pivot pin 26 in the direction shown by arrow 28 in FIG. 4, the fish stringer 12 is compressed between the jaws 27 and shoulder plate 23 of the frame, and is suitably restrained.

In use, the needle end 13 of the stringer 12 is forced between the jaws 27 and the shoulder plate in direction to force the jaws away from the plate. The needle end is then pulled through until the standing part of the stringer 12 is gripped by the jaws and shoulder plate. Then the end of the stringer 12 which has the fish and therefore the heavier end of the stringer will act to tend to pull the stringer 12 to bring the jaws 27 even closer to the shoulder plate 23. This makes the jaws grip the stringer 12 ever tighter.

In a preferred embodiment, a cover means 30 is provided which can selectively cover and uncover the jaws 27 of the jaw means 24. The cover means 30 includes a cover 33 and a track means 31 which permits slidable movement of the cover 35 with respect to the frame 11 to selectively cover or uncover the jaws 27 and the top edge of the shoulder plate 23. A threaded limit pin 35 mounted in the bottom of base plate 22 cooperates with the track means 31 to limit movement of cover means 30 between a desired open and closed position.

Figure 5:
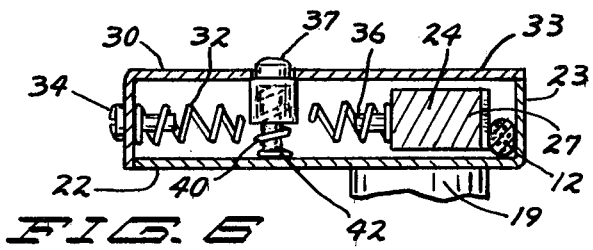
FIG. 5 is a bottom plan view of the device shown in FIG. 3.
Figure 6:
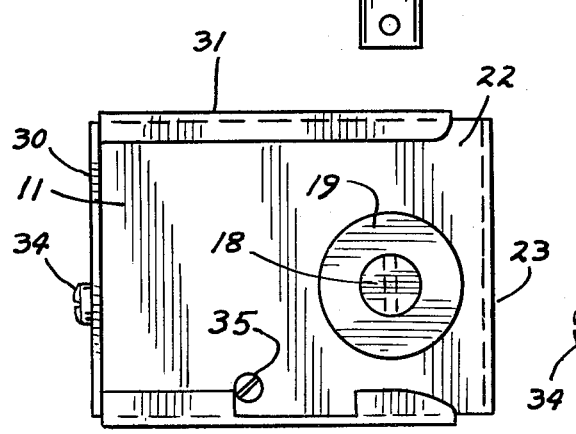
FIG. 6 is a vertical sectional view taken on the line 6—6 in FIG. 4.
Figure 7:
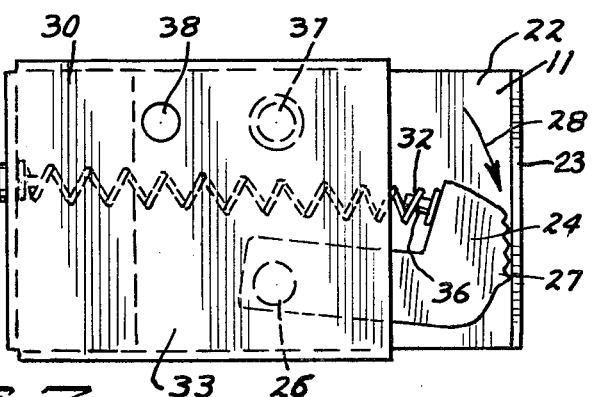
FIG. 7 is a top plan view of the device of FIG. 4 but with a locking means released to permit a top cover to lie in its open position.

When cover means 30 is in its closed position as seen in FIGS. 2 through 6, the stringer 12 cannot pass away from the jaws 27 and should plate 23 in a direction perpendicular to the base plate 22 of the frame 11. However, when the cover means 30 is released to move to the position as seen in FIG. 7, the operator can simply use one hand to lift up on the needle 13 of the stringer 12 or any other convenient part of the stringer to easily remove it from between the jaws 27 and the shoulder plate 23. FIG. 7 shows the position of the parts after the stringer has thus been removed.

Figure 4:
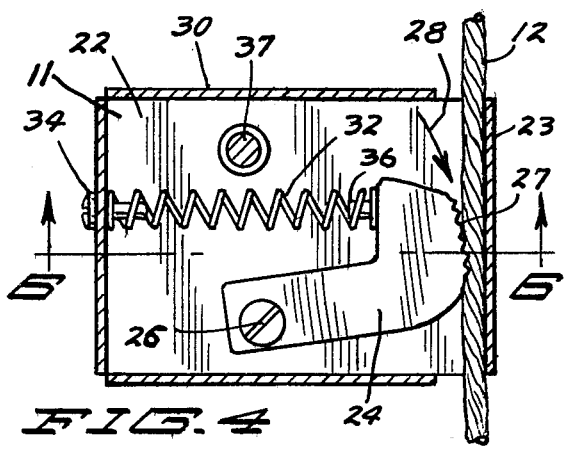
FIG. 4 is a horizontal sectional view taken on the line 4—4 in FIG. 3.

A cover and jaw biasing spring 32, as seen in FIGS. 4 and 5, is positioned in a preferred embodiment of the invention to urge the jaw means 24 toward the shoulder plate 23 so as to restrain the stringer 12. Bolt 34 and shaft 36 provide centering means for the spring 32. Thus, when the cover means 30 is in its closed position, as seen in FIGS. 4 and 6, the spring 32 urges the jaws 27 into the stringer 12; and tends to urge the cover means 30 toward its open position as seen in FIG. 7.

To lock the cover 33 in closed position, retainer button 37 is fitted in a hole 38 provided in the cover. The button slides on retainer button shaft 42 which is mounted on base 22. A compression coil spring 40 urges the button up through that hole. As long as the button 37 extends through the hole 38, the cover means 30 cannot be opened. Depression of the button 37 against the action of spring 40 permits the cover means 30 to slide to its open position urged by the cover and jaw biasing spring 32. The stringer 12 can then be removed from the holder 17 by lifting it in a direction perpendicular from the base plate 22 of the frame 11. The fisherman can hold the fish in one hand, remove the stringer from the holder with his other hand, and then add the fish to the stringer by passing the metal pointed or needle end 13 of the stringer through the gills and mouth of the fish. Once this is done, the fish holding hand is free to push the cover 33 to its closed position, allowing retainer button 37 to snap back into the hole 38 to lock the cover means in that position. The needle 13 can then be reinserted between the jaws 27 and the shoulder plate 23 and pulled through to again allow jaws 27 to clamp the standing part of the stringer 12 against the shoulder plate 23.

Alternatively, the stringer 12 can be inserted between the jaws 27 and the shoulder plate 23 before the cover 33 is closed by the simple expedient of laying the stringer down between the jaws 27 and the shoulder plate 23 while pushing the jaw member 24 out of the way. Upon releasing jaw means 24, the stringer is again locked in position, and cover means 30 can again be pushed and locked in its closed position.

While the holder of the invention has been described in terms of use with a fish stringer, it is evident that it will be effective in easily restraining and releasing and firmly holding many other and similar flexible lines or ropes, including, for example, lines to secure a boat to a dock or an anchor.

The embodiments of the invention in which an exclusive property or privilege is claimed are defined as follows:

1. A device for restraining a flexible line such as a fish stringer, said device including:
   A. a frame having a base plate and a shoulder plate perpendicular to the base plate;
   B. jaw means pivotally mounted on said base plate in position to move on an arc approximately tangent to said shoulder plate in a first direction toward said shoulder plate and in a second direction away from said shoulder plate, said jaw means approaching said shoulder plate at least as close as the thickness of a line to be restrained;
   C. mounting means for mounting said frame on an object; and
   D. cover means including a cover parallel and spaced from said base plate and movable in direction parallel to the base plate between a closed position wherein said shoulder plate and said jaw means are covered and an open position wherein said shoulder plate and a portion of said jaw means adjacent said shoulder plate are uncovered.

2. The device of claim 1 wherein:
   E. said cover means includes means for preventing removal of a line between said shoulder plate and said jaw means in a direction perpendicular to the plane of said base plate when said cover is in its closed position.

3. The device of claim 2 wherein:
   F. said cover means further includes means for releasably locking said cover in its closed position.

4. The device of claim 1 wherein:
D. said mounting means includes stem means extending away from an underside of said base plate in perpendicular relationship thereto, said stem means being sized to cooperatively associate with an oar lock socket in the gunwale of a boat.

5. A device for restraining a fish stringer, said device including:
- A. an L-shaped frame having a base plate and a shoulder plate perpendicular to said base plate;
- B. jaw means for engagement of a flexible line of a fish stringer against said shoulder plate, said jaw means being pivotally mounted on said base plate in position to move on an arc approximately tangent to said shoulder plate in a first direction away from said shoulder plate, said jaw means approaching said shoulder plate at least as closed as the thickness of the fish stringer to be restrained;
- C. cover means including a cover parallel to and spaced from said base plate and movable between a closed position wherein said shoulder plate and said jaw means are covered and an open position wherein said shoulder plate and a portion of said jaw means adjacent said shoulder plate are uncovered, thus effectively obstructing removal of the fish stringer from between said jaw means and said shoulder plate in direction perpendicular to the plane of said base plate when said cover means is in said closed position;
- D. mounting means attached to said frame for mounting said frame to an object;
- E. said cover means including means for locking said cover in its closed position, said cover means including a retainer button hole provided in said cover and a retainer button slidably mounted with respect to said base plate, together with resilient means urging said retainer button in direction to enter said retainer button hole when said cover is moved to its closed position;
- F. bias means operative to urge said jaw means in said first direction and to urge said cover means to move said cover to its open position; and
- G. said mounting means including stem means on said base plate sized to cooperatively associate with a provided vertical hole in a gunwale of a boat.

* * * * *